(12) United States Patent
Terwart et al.

(10) Patent No.: US 8,271,171 B2
(45) Date of Patent: Sep. 18, 2012

(54) CLUTCH CHARACTERISTIC ADAPTION METHOD FOR AUTOMATIC DUAL CLUTCH TRANSMISSION

(75) Inventors: Markus Terwart, Thundorf (DE); Mario Bühner, Gerolzhofen (DE); Karl Locher, Prongstetten-Tigerfeld (DE); Martin-Joachim Bader, Mochenwangen (DE); Dietmar Zuber, Rödental (DE); Olaf Moseler, Werneck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 491 days.

(21) Appl. No.: 12/610,557

(22) Filed: Nov. 2, 2009

(65) Prior Publication Data

US 2010/0114443 A1   May 6, 2010

(30) Foreign Application Priority Data

Nov. 3, 2008  (DE) .......................... 10 2008 043 384

(51) Int. Cl.
  *B60W 10/02*  (2006.01)
(52) U.S. Cl. .......................... 701/68; 192/90
(58) Field of Classification Search .................. 701/68, 701/36, 51, 55, 56, 58, 60, 66–67, 71, 80, 701/82, 90; 192/70.252, 85.63, 84.6, 90; 477/174, 167, 181, 166, 83, 84, 86, 5, 6, 477/104, 70, 175, 176
See application file for complete search history.

(56) References Cited

U.S. PATENT DOCUMENTS

| | | | |
|---|---|---|---|
| 5,679,091 A * | 10/1997 | Salecker et al. | ............... 477/86 |
| 6,490,944 B1 | 12/2002 | Heinzel et al. | |
| 7,131,932 B2 * | 11/2006 | Fahland et al. | ............... 477/174 |
| 2007/0208480 A1 | 9/2007 | Disch-Simon et al. | |

FOREIGN PATENT DOCUMENTS

| | | |
|---|---|---|
| DE | 199 39 818 C1 | 1/2001 |
| DE | 101 10 898 A1 | 9/2001 |
| DE | 19931160 A1 | 11/2001 |
| DE | 101 36 731 A1 | 2/2003 |
| DE | 10 2004 017 794 A1 | 10/2005 |
| DE | 10 2007 025253 A1 | 4/2008 |
| DE | 10 2007 011 191 A1 | 11/2008 |
| EP | 1 067 008 A2 | 1/2001 |
| WO | 01/14761 A1 | 3/2001 |
| WO | 03/074895 A2 | 9/2003 |
| WO | 2004/076225 A1 | 9/2004 |

* cited by examiner

*Primary Examiner* — Dalena Tran
(74) *Attorney, Agent, or Firm* — Davis & Bujold, PLLC

(57) ABSTRACT

A method for clutch characteristic curve adaptation of an automatic dual-clutch transmission which comprises two sub-gearboxes each with an input shaft connected, via a friction clutch, to the drive shaft of a motor and several gears that are shifted via a friction-synchronized gear clutch. A value of the current touch point of the friction clutch can be determined with the motor running and the gears disengaged in a load-free sub-gearbox. The method includes the steps of starting synchronization of a gear clutch with a defined force of a regulator. Waiting until the gear clutch is synchronized. Engaging the friction clutch of the until the gear clutch is synchronizes. Determination the current touch point from the current synchronous torque of the gear clutch and the current regulating parameter of the associated clutch regulator. Then, adapting the clutch characteristic curve of the friction clutch in view of the current touch point.

25 Claims, 4 Drawing Sheets

CLUTCH CHARACTERISTIC ADAPTION METHOD FOR AUTOMATIC DUAL CLUTCH TRANSMISSION

This application claims priority from German patent application serial no. 10 2008 043 384.5 filed Nov. 3, 2008.

FIELD OF THE INVENTION

The invention involves a method for clutch characteristic curve adaptation of an automatic dual-clutch transmission which comprises two sub-gearboxes each with an input shaft connected, via a friction clutch, to the drive shaft of a drive motor and several gears shiftable via a friction-synchronized gear clutch, whereby a current value of the touch point of the associated friction clutch can be determined in conjunction with partial engagement of the friction clutch in question and the acquisition of the relevant operating parameters with a running motor and disengaged gears in a load-free sub-gearbox.

BACKGROUND OF THE INVENTION

Motor vehicles are increasingly equipped with automatic clutches which can be designed, like in the manner of construction of a single or multiple-disc dry clutch equipped with a pressure spring, as a passively engagable or actively disengageable friction clutches, or, as in the manner of construction a wet-running multiple-disc clutch, as actively engagable or passively disengageable friction clutches. With the use of an automatic clutch, the driver is freed, when starting or shifting, from the performance of a coordinated engaging and disengaging of the clutch and can concentrate on other control tasks. In addition to an increase of driving comfort, a reduction of fuel use and damaging emissions from the vehicle in question can be obtained by the use of an automatic clutch, especially in conjunction an automatic standard transmission.

In order to guarantee comfortable and low-wear operation of an automatic friction clutch, an exact as possible knowledge of the association between a regulating parameter of an associated clutch actuator acquired by a sensor or a transmission element placed between the clutch actuator and an activation element of the friction clutch, like a regulating path, a regulating pressure or an electric regulating current, and the required torque conveyed from the friction clutch in the respective operating position. This combination, at least in the form of a characteristic torque curve as the function of a regulating parameter, preferably a regulating path, is deposited in a data storage facility of an associated control unit from whence the clutch regulator in question can be controlled.

The value of that regulating parameter of the friction clutch (designated among other things as the touch point, the point of engagement, kiss point, the grip point or the measuring point) forms an essential reference point for the torque curve of a friction clutch at which with an activated clutch regulator in the engaged sense the motor-side and transmission-side friction elements of the clutch align and come in frictional contact so that the friction clutch just begins to transmit a minimal torque and where with an activated clutch regulator in the disengaging direction, the motor-side and transmission-side friction elements of the clutch are just separated so that the frictionally-engaged conveyance of a torque by the friction clutch ends precisely.

While the torque gradient, i.e. the inclination of the torque curve, practically depends only on the friction value between the friction elements of the clutch, and thus is almost constant within the control range of the friction clutch, the touch point and thus the control range of the torque curve can displace as a dependency of relevant operating parameters, like the operating temperature of the clutch and the wear condition of the friction coverings. Furthermore, there can be deviations with respect to the touch points within a series production of friction clutches of the same design because of manufacturing tolerances.

For comfortable and low-wear operation of a friction clutch and the start-up and shifting procedures controlled by it, as exact a knowledge as possible of the respectively current touch point is required to which the torque curve of the friction clutch can be adapted. That applies in particular for the two friction clutches of a dual-clutch transmission in which at least one clutch is used as a start-up clutch and both clutches can alternately be engaged and disengaged overlapping in time. By means of a possibly frequent and exact adaptation of the torque curve of both friction clutches of a dual-clutch transmission, a constant driving and shifting quality of the vehicle in question is striven for in all operating conditions and for its entire useful life.

Accordingly, several procedures for a clutch characteristic curve adaptation of a, automatic dual-clutch transmission are proposed which are based on the fact that with a running motor and disengaged gears in a load-free sub-gearbox, a current value of the touch point of the associated friction clutch with which the torque characteristic curve is to thereafter be adapted is determined in conjunction with a partial engagement of the friction clutch in question and the acquisition of relevant operating parameters.

Thus in a known procedure, for example, for a clutch characteristic curve adaptation of an automatic dual-clutch transmission according to WO 2003/074 895 A2, it is proposed that the current touch point of the friction clutch of a sub-gearbox (when the vehicle is stopped, a main brake or parking brake is activated, the motor is running and a gear is engaged) can be determined by the acquisition of the current value of the regulating parameter of the clutch regulator by means of the engagement of the clutch until the attainment of an increase of the motor torque of the drive motor and the torque characteristic curve in question is thereby adapted.

The known procedure indeed includes a zero point adjustment of the clutch regulator; nevertheless, the determination or adaptation of the touch point is only possible when a vehicle is stopped and idling control of the drive motor is activated, and is thus relatively seldom possible. In addition, the known procedure is critical for safety, since too great an engagement of the friction clutch, i.e., too high a clutch torque, can result in an unintentional rolling of the vehicle, whereas too small an engagement of the friction clutch, and likewise a too small clutch torque, can result in a relatively too small increase of the motor torque that can not be distinguished from other impairments of the idling revolutions of the drive motor.

In another known method for clutch characteristic curve adaptation of an automatic dual-clutch transmission, it is provided in WO 2001/014 761 A1, that with disengaged gears and a sufficiently high rotational speed difference at the friction clutch of the currently load-free sub-gearbox, the friction clutch is slowly engaged, whereupon the input shaft of the transmission in question is accelerated to the motor speed of the drive motor after exceeding the touch point. The variations in time of the input shaft rotation speed and the regulating parameter of the associated clutch regulator are acquired and stored. The touch point of the applicable friction clutch is then determined from the association of the rotation speed gradients of the input shaft and the regulating parameter of the clutch regulator in a manner not further described. In the event of an initially too low rotational speed difference, it should be increased by starting the synchronization of the gear clutch of a gear of the applicable sub-gearbox. The known method can be used both with a stopped vehicle and when driving, but features a relatively high degree of inexactness in the determination of the touch point because of multiple influence parameters.

It is envisioned in a partially similar method for clutch characteristic curve adaptation of an automatic dual-clutch transmission according to EP 1 067 008 B1 that with disengaged gears and a sufficiently high rotational speed differential on the friction clutch of the momentarily load-free sub-gearbox, the friction clutch is first partially engaged with a defined clutch regulating force, whereupon the associated input shaft of the transmission is accelerated to the rotational speed of the drive motor. Thereafter synchronization of a gear clutch of the same sub-gearbox is started with a defined regulating force, by means of which a synchronous torque exceeding the clutch torque of the friction clutch is produced, and the rotational speed of the input shaft separates itself or differs from the motor rotational speed. After a sufficiently high rotational speed difference is reached on the gear clutch, the regulating force is again slackened to the synchronization of the gear clutch so that the rotational speed of the input shaft again approximates the motor rotational speed under the effect of the clutch torque of the friction clutch.

A rotational speed gradient is determined from the rotational speed progression of the input shaft of the transmission acquired by sensor and stored in memory by means of which the current clutch torque of the friction clutch is determined under consideration of the inertia moment of the input shaft and a drag or braking moment acting on the input shaft and from that the actual touch point of the friction clutch is derived.

This known method is accordingly relatively time-consuming and disadvantageously requires a high storage and calculation capacity. The set clutch torque of the friction clutch must also be comparatively low, since otherwise it can not be overcome by the temporarily set synchronous torque of the synchronization of the gear clutch or there is the danger of an unintentional complete engagement of the gear clutch. Such a determination of the touch point of the friction clutches is accordingly relatively inexact.

The previously named method for characteristic curve adaptation of an automatic dual-clutch transmission is changed in WO 2004/076 225 A1 in that after partial engagement of the friction clutch with a defined clutch regulating force, the synchronization of a gear clutch of the same sub-gearbox is activated with a continuously increasing regulating force until the synchronous torque of the gear clutch exceeds the clutch torque of the friction clutch. In this operating state, the rotational speed of the applicable input wave is separated from the motor rotational speed, which is recognized by signals of the associated rotational speed sensors. The current torque of the friction clutch is determined by the association of the current regulating parameter of the gear regulator or the synchronous torque produced thereby to the current regulating parameter of the clutch regulator with which the current touch point of the friction clutch can be determined or adapted. In contrast to the named method, the sequence of this known method is simplified and accelerated to be sure; the disadvantages caused by the low regulating force level, however, remain unchanged.

SUMMARY OF THE INVENTION

The present invention is therefore based upon the objective of providing a method for clutch characteristic curve adaptation of an automatic dual-clutch transmission of the type mentioned at the beginning, with which a more exact and definite determination of a current value of the touch point of both friction clutches is determined with simple control sequences and without any additional technical effort.

Attaining this object consists in that, for adapting the clutch characteristic curve of a dual-clutch transmission which comprises two sub-gearboxes each with an input shaft connected, via a friction clutch, with the drive shaft of a drive motor and several gears which can be respectively shifted via a friction-synchronized gear clutch, the current value of the touch point of the associated friction clutch being determined when the motor is running and gears are disconnected in connection with a load-free sub-gearbox in conjunction with a partial engagement of the applicable friction clutch and the acquisition of relevant operating parameters using the following procedural steps:

1. Start of the synchronous point of a gear clutch of a load-free sub-gearbox with a defined regulating force of the associated gear regulator,
2. Waiting until synchronization is attained on the gear clutch in question,
3. Successive engagement of the friction clutch of the same sub-gearbox until a cancellation of the synchronization is determined on the gear clutch,
4. Determination of the current touch point of the friction clutch from the current synchronization torque of the gear clutch and the current regulating parameter of the associated clutch regulator,
5. Adaptation of the clutch characteristic curve of the friction clutch with the current touch point.

By means of the start of the synchronous point of the gear clutch the input-side part of the applicable sub-gearbox, which comprises the associated input shaft, is accelerated under the effect of the synchronization torque preset in the synchronization of the gear clutch on the output-side rotational speed of the gear clutch, i.e., a synchronization is produced on this gear clutch. As a result, a significant rotational speed differential is produced on the associated friction clutch which can subsequently again be reduced or cancelled by the successive engagement of the friction clutch. If the clutch torque of the friction clutch exceeds the synchronous torque of the gear clutch, the input shaft of the sub-gearbox is accelerated or delayed in the direction of the input-side rotational speed of the friction clutch identical with the motor rotational speed of the drive motor, depending on whether the synchronized gear lies above or below the gear set in the other sub-gearbox.

The corresponding change of rotational speed of the input shaft can be recognized in a known manner by means of rotational speed sensors already present in any case, like a rotational speed sensor placed on the drive shaft of the drive motor, a rotational speed sensor placed on the input shaft of the sub-gearbox, and a rotational speed sensor placed on a common output shaft of the dual-clutch transmission so that the cessation of the synchronization on the gear clutch associated therewith can be determined without problems.

In this operating state, a current value of the touch point of the friction clutch is determined from the current synchronous torque of the gear clutch derived from the regulating force of the gear regulator and the current regulating parameter, like for example, the regulating path or the regulating pressure of the clutch regulator of the friction clutch which can occur, for example, in a known manner by means of the subtraction or addition of an appropriate offset value from the actual value of the regulating parameter. The clutch characteristic curve of the friction clutch is adapted with the touch point determined in such a manner or in another way.

The method of the invention for clutch characteristic curve adaptation of an automatic dual-clutch transmission features a relatively simple control sequence and therefore only needs a small time span for its sequence. The method of the invention likewise does not require any additional technical effort, since access is only made to sensor data from already present rotational speed and regulating parameter sensors.

Since the clutch torque of the friction clutch exceeds the synchronous torque at the gear clutch within the sequence of the method, a relatively high synchronous torque can be set on the gear clutch without the danger appearing of interconnection of the gear clutch, namely unintentional engagement of the gear in question. Accordingly, the synchronous torque is kept comparatively small so that it is not noticeable to the driver of the vehicle, when the clutch torque of the friction clutch exceeds the synchronous torque. Furthermore the synchronous torque is determined in a load-free manner and it remains constant during the determination of the touch point. In addition, the synchronous position is constantly monitored for safety sake. As soon as this synchronous position is exceeded, the procedure is stopped. That prevents the clutch torque from further increasing which would then result in a noticeable delay of the vehicle. In particular, a higher regulating force level can be preset in the gear regulator and the clutch regulator or a higher torque level in the gear clutch and the friction clutch compared to the method known from WO 2004/076225 A1, owing to which there advantageously is a higher accuracy in the determination of the touch point of the friction clutch.

The determination of a current touch point and the adaptation of the clutch characteristic curve can be performed very close in time to each other with a stopped vehicle for the friction clutches of both sub-gearboxes, whereby both a serial time sequence as well as a parallel time sequence is possible to determine the current touch points of both friction clutches, since no gear must be engaged in each other sub-gearbox.

In order not to affect the current driving operation, the determination of a current touch point and the adaptation of the clutch characteristic curve are usefully performed on the other hand during the drive for the friction clutch of the sub-gearbox that is load-free at the moment.

To ensure a problem-free procedure run, it is appropriately provided in a preparatory phase of the method that before the determination of the current touch point of a friction clutch its degree of engagement is checked and the applicable friction clutch is completely disengaged in the case of an at least partially engaged state. Furthermore, first of all checking the shift status of the sub-gearbox in question and in the event of an engaged gear disengaging the applicable gear is preferable.

In an actively engagable construction of the friction clutch, for example as a multiple disc clutch, and a construction of the associated clutch regulator as a hydraulic or pneumatic adjusting cylinder, it is advantageously provided for the acceleration of the procedural sequence that the clutch regulator is first filled with a filling pressure and a low initializing pressure before the engagement of the friction clutch. The friction elements of the friction clutch in question are thereby pre-stressed in the direction of the touch point so that the following engagement procedure and the reaching of the touch point occur faster.

A determination of the current synchronous point of the applicable gear clutch is appropriately performed before the determination of a current touch point of the friction clutch in order to increase accuracy.

To simplify the procedural control, the synchronous point of the gear clutch of the same gear can be started each time in the load-free sub-gearbox. It thereby preferably involves a gear whose gear clutch is provided with an especially robust synchronization or is comparatively rarely engaged.

When a vehicle is stopped, however, it is appropriate that the synchronous point of the gear clutch of a starting gear is started in the load-free sub-gearbox, since a relatively small rotational speed difference is preset on the applicable gear clutch and this starting gear is also used with high probability for a following start. The wear on the synchronization of the gear clutch caused by the procedure is therefore relatively small and the applicable starting gear can be immediately fully engaged for acceleration of a following starting procedure, if applicable at the end of the procedural sequence.

It is likewise advantageous while driving, if the synchronous point of the gear clutch of the next highest or lowest gear in relation to the gear engaged in the other sub-gearbox is started. Because of the relatively small rotational speed difference at the gear clutch in question, the wear on the associated synchronization caused by the method is reduced. Furthermore, in a looming shift change the gear in question will form the target gear with a high degree of probability so that the gear can, if applicable, be immediately fully engaged at the end of the procedural sequence.

In special cases, it can also occur when driving that the synchronous point of the gear clutch of the gear engaged in the other sub-gearbox is started two or three gear transitions higher or in a lower gear. Such a control behavior can then be used, when the immediately adjacent gears can not be used, or when a determined touch point should be checked by performance of a procedure with another gear other than the immediately adjacent gear.

The engagement of the friction clutch of the load-free sub-gearbox preferably occurs in a gradual progression of the regulating parameters of the mentioned clutch regulator with an applicable stage offset and an applicable stop duration per engagement stage. The gradual engagement of the friction clutch requires, to be sure, a certain control effort, but it has the advantage that after each engagement step the effect is then awaited, i.e., a possible cancellation of the synchronization at the gear clutch in question before the next engagement step follows. Higher accuracy hereby results in the determination of the touch point compared to a continuous engagement.

The stage offset of the engagement stage of the regulating parameter is advantageously formed from an applicable progressive ratio and a following applicable ramp jump, whereby the application, i.e. adaptation to the particular vehicle configuration and special customer desires, relates both to the proportional height of the progressive ratio and the ramp jump as well as to the gradient of the ramp jump. The stage offset of the engagement stage of the regulating parameter can be designed in an extreme case as a pure progressive ratio or a pure ramp jump, as necessitated by the application.

The determination of a current touch point of the friction clutch is appropriately broken off during the gradual engagement of the respective friction clutch, when the cessation of the synchronization of the gear clutch in question is determined before the attainment of the applicable minimum number of engagement stages and is not determined up to the expiration of an applicable maximum number of engagement stages of the regulating parameters of the respective clutch regulator.

In the presence of an actively engagable friction clutch, engagable and disengagable by means of a pressure adjusting cylinder, it is appropriately provided (in order to make a subsequent ascertainment of the touch point possible) that with cessation of the synchronization at the respective gear clutch established before attaining the minimum number of engagement stages, the filling pressure and/or the initializing pressure for pre-filling the clutch regulator is reduced upon the subsequent ascertainment of the touch point of the same friction clutch; and that if cessation of the synchronous running at the respective gear clutch is not established after the expiration of the maximum number of engagement stages, the filling pressure and/or the initializing pressure for pre-filling the clutch regulator is raised during the subsequent ascertainment of the touch point of the same friction clutch.

According to a second variant of the method of the invention, the engagement of the friction clutch of the load-free sub-gearbox can, however, occur in a ramp-like progression of the regulating parameter of the respective clutch regulator with an applicable regulating gradient. Opposing the advantage of simple controllability of the constant engagement process there stands the disadvantage of reduced precision in the determination of the touch point which results from the time delay between exceeding the synchronous torque of the gear clutch by the clutch torque of the friction clutch and sensor-detected cessation of synchronization at the gear clutch.

Analogously to the gradual engagement of the friction clutch, ascertaining a current touch point (of the friction clutch) is appropriately broken off when cessation of the synchronization at the gear clutch in question is established before the attainment of the applicable minimum engagement time and is not established up until the expiration of an applicable maximum engagement time of the respective clutch regulator.

With the presence of an actively engagable friction clutch, engagable and disengagable by means of a pressure adjusting cylinder, it is provided in this case to facilitate a later determination of the touch point, that upon cessation of the synchronization of the gear clutch before the attainment of a minimum engagement time, the filling pressure and/or the initializing pressure for pre-filling the clutch regulator is reduced at the following determination of the touch point of the same friction clutch, and that with cessation of the synchronization of the gear clutch after expiration of the maximum engagement time, the filling pressure and/or the initializing pressure for pre-filling the clutch regulator is increased at the following determination of the touch point of the same friction clutch.

After an applicable number of interruptions of the determination of a current touch point by means of synchronization of the same gear clutch, there apparently is an error present in the control of the gear clutch in question. Therefore it is appropriately provided in this case, that a gear-related error report is stored in an error memory of the control device and for the following determination of a current touch point of the friction clutch, a gear clutch of another gear of the same sub-gearbox is determined.

The cancellation of the synchronization at the respective gear clutch can thereby be determined in that the sensor detects, when the rotational speed difference at the gear clutch has reached or exceeded a determined rotational speed difference threshold or a rotational speed boundary value.

A second possibility for determining the cancellation of synchronization of the respective gear clutch consists in that the sensor records when the rotational speed difference between the two input shafts or at the friction clutch in question has reached or exceeded a determined rotational speed differential threshold.

To enable a problem-free procedural sequence, determination of the current touch point of a friction clutch should only be started in the presence of a largely stationary operation of the vehicle in question and should be ceased upon the appearance of operational occurrences impeding or ending a stationary operation. Interfering operational occurrence in this sense are to be seen, for example, in a change of the power requirement initiated by a driver-side deflection change of the gas pedal or speed control device, in a braking maneuver caused by a driver-side activation of the brake pedal or a braking assistance, and in a shifting request initiated manually by the driver or automatically by an associated transmission control device.

To avoid unintentional engagement of the respective gear, it is appropriately provided that the regulating path of the associated gear regulator or an associated transfer element, such as, for example an associated shifting rod, is determined by means of at least one directional sensor, and that upon reaching or exceeding a predetermined boundary regulating position the determination of a current touch point of the friction clutch is ceased.

A bad road condition of the stretch driven during the procedural sequence can have a negative effect on the procedural results because of the vibrations appearing. It is therefore appropriate that, during driving, the condition of the roadway is determined by means of suitable sensors, like for example drive mechanism elements and/or acceleration sensors placed on the chassis of the vehicle in question, and that the determination of the current touch point is ceased upon recognition of a bad stretch of roadway.

On the other hand, the sequence of the method of the invention can have a negative effect on other ongoing control sequences in the drive train. This applies in particular to a driving simulation on a roller dynamometer on which the consumption and exhaust behaviors of a vehicle are determined or checked. Therefore to avoid the negative influence of this method, a simulated trip on a roller dynamometer is usefully determined by means of suitable sensors and upon recognition of a roller dynamometer trip the determination of the current touch point of the friction clutch is ceased.

After a successful sequence and breaking off of the determination of a current touch point, the friction clutch is completely disengaged, the gear regulator in question is moved to the neutral position and, if necessary, the previously engaged gear or a gear requested in the meantime is engaged. It is understood that the gear of the gear clutch used for synchronization can be engaged directly after the complete disengagement of the associated friction clutch, i.e., without a prior move to the neutral position, in so far as this agrees with the previously disengaged gear or the gear requested in the meantime.

BRIEF DESCRIPTION OF THE DRAWINGS

To illustrate the invention, there follows a description with drawings of embodiments, wherein.

DETAILED DESCRIPTION OF THE PREFERRED EMBODIMENTS

Figure 4:
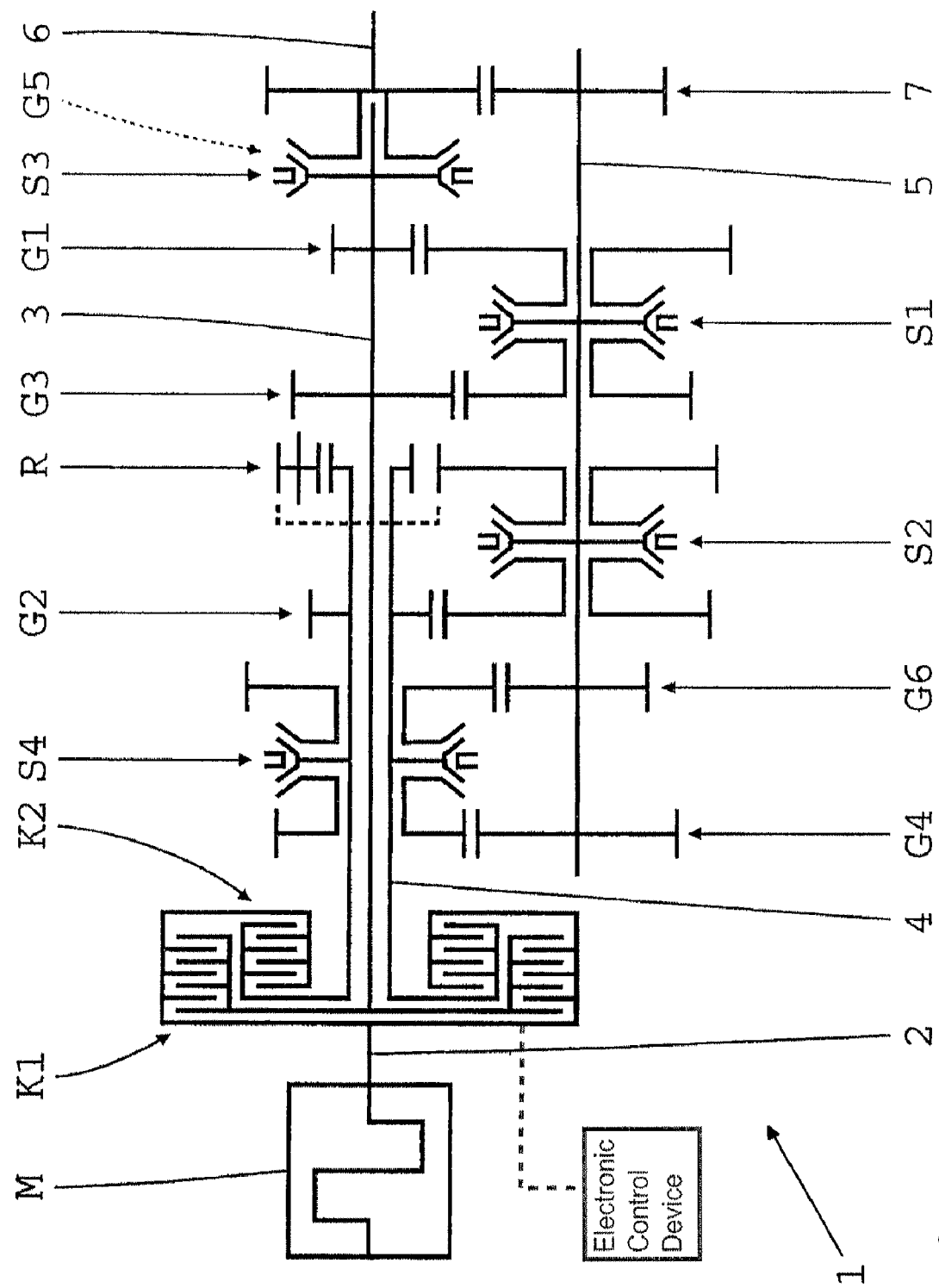
FIG. 4: Is a schematic depiction of a dual-clutch transmission.

A known dual-clutch transmission 1 designed here, for example, as a six gear transmission in which the method of the invention for clutch characteristic curve adaptation can be used is depicted in a simplified manner in FIG. 4. The method of the invention, however, also functions in another dual-clutch transmission, for example in a dual-clutch transmission with seven or eight gears. The dual-clutch transmission 1 features a longer first input shaft 3, a shorter second input shaft 4 designed as a hollow shaft and placed coaxially above the first input shaft 3, a countershaft 5 positioned parallel to the two input shafts 3, 4, as well as an output shaft 6 positioned coaxially and axially adjacent to the first input shaft 3.

The first input shaft 3 is connectable by the engagement of respectively one associated gear clutch via the gear wheel sets of a first forward gear G1 and a third forward gear G3 with the countershaft 5, which is in a power-connection with the output shaft 6 via an output stage 7 formed from two fixed wheels. The gear wheel sets of the first and third forward gears G1, G3 are formed by means of a geared wheel pair with a fixed wheel placed in a rotationally-fixed manner on the first input shaft 3 and an idle wheel positioned so as to turn on the countershaft 5. The gear clutches provided for the connection of the idler wheels with the countershaft 5 needed for shifting are constructed in a friction-synchronized manner and are combined into a first common shift packet S1 with two shift positions and one neutral position.

The fifth forward gear G5 constructed as a direct gear can be shifted by means of the production of a direct power connection of the first input shaft 3 with the output shaft 6 via an associated friction-synchronized gear clutch which is the sole component of third shift packet S3 with a sole shift position and a neutral position placed on the output-side end of the first input shaft 3. On the input side, the first input shaft 3 can be connected with the drive shaft 2 of a drive motor M constructed as a combustion piston engine via an initial, radial, exterior friction clutch K1 constructed as an actively engagable multiple disc clutch.

The second input shaft 4 is connectable with the countershaft 5 by the engagement of an associated gear clutch via the gear wheel sets of a second forward gear G2, a fourth forward gear G4, a sixth forward gear G6, and a reverse gear R. The gear wheel set of the second forward gear G2 is formed by a pair of geared wheels with a fixed wheel placed in a rotationally fixed manner on the first input shaft 3 and an idler wheel placed so as to rotate on the countershaft 5. The gear wheel set of the reverse gear R comprises an intermediate wheel for reversal of the direction of rotation in addition to a fixed wheel placed in a rotationally fixed manner on the first input shaft 3 and an idler wheel placed so as to rotate on the countershaft 5.

The gear clutches provided for the connection required for shifting of the idler wheels of the second forward gear G2 and the reverse gear R with the countershaft 5 are constructed in a friction-synchronized manner and are combined in the second common shift packet S2 with two shift positions and one neutral position.

The gear wheel sets of the fourth and sixth forward gears G4, G6 are each formed by a pair of threaded wheels with an idler wheel placed on the second input shaft 4 so as to turn and a fixed wheel positioned on the countershaft 5 in a rotationally fixed manner. The gear clutches of the fourth and sixth forward gears G4, G6 provided for the connection of the idler wheels with the second input shaft 4 needed for shifting are constructed in a friction-synchronized manner and are combined in a fourth common shift packet S4 with two shift positions and one neutral position.

On the input side, the second input shaft 4 is connected with the drive shaft 2 of the drive motor M via a second, radial, interior friction clutch K2 constructed as an actively engagable multiple disc clutch.

Thus, together with the first friction clutch K1 and the gear wheel sets and gear clutches S1, S3 of the uneven forward gears G1, G3, G5, the first input shaft 3 forms a first sub-gearbox, while the second input shaft 4 together with the second friction clutch K2 and the gear wheel sets and gear clutches S2, S4 of the even forward gears G2, G4, G6 and the reverse gear R form a second sub-gearbox.

Shifting between a drive gear (e.g., G3) of the first sub-gearbox and a target gear (e.g., G4) of the other sub-gearbox occurs after a prior engagement of the target gear G4 by means of a time-overlapping engagement of the friction clutch K2 associated with target gear G4 and disengagement of friction clutch K1 associated with drive gear G3 and thus without any interruption of the tractive force.

In order that during the time-overlapping engagement and disengagement of both friction clutches K1, K2 the conveyed torque $M_K$ of the friction clutch K1 associated with the drive gear G3 is reduced, an exact knowledge of the torque characteristic curve $M_K(x_K)$ or $M_K(p_K)$ as a function of a relevant regulating parameter, like the engagement path XxK or the engagement pressure $p_K$, is required. To determine relevant influences, like the operating temperature and the wear condition of each friction clutch K1, K2, a current value of the touch point $x_{TP}$, $p_{TP}$, of the respective friction coupling K1, K2 is determined and with it the torque characteristic curve $M_K(p_K)$ is adapted, i.e., corrected accordingly.

Figure 1:
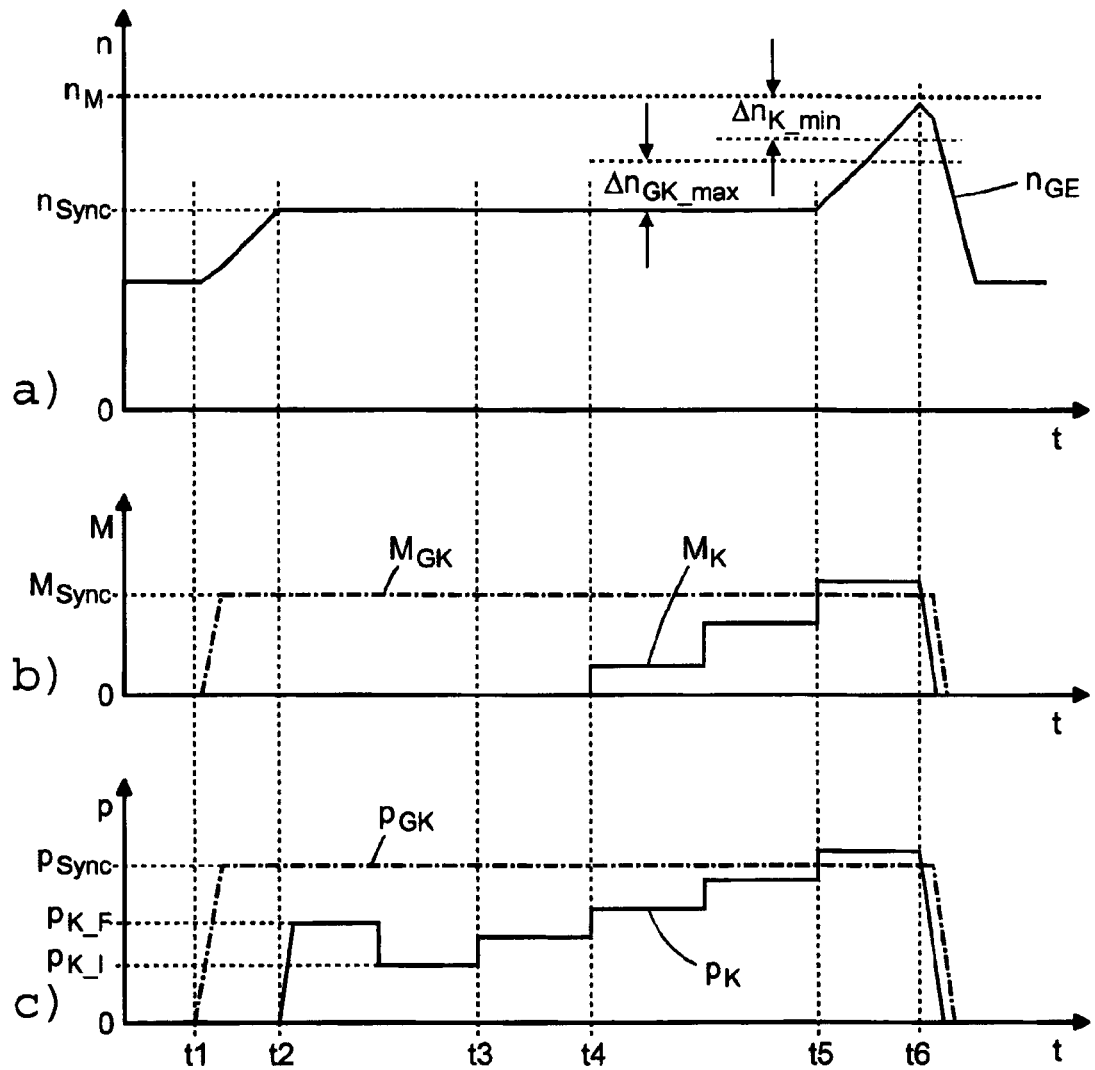
FIG. 1: Is a timing diagram with rotational speed, rotational torque and regulating pressure progressions according to a first variant of the method of the invention.

Qualitatively shown in the diagrams of FIG. 1 based on the time progressions is how during a largely stationary drive the current touch point $x_{TP}$, $p_{TP}$ of the friction clutch K2 associated with the currently load-free sub-gearbox is determined using a first variant of the method of the invention. Shown for that purpose are in partial diagram a) the motor rotational speed $n_m$ of the drive motor M and the rotational speed $n_{GE}$ of input shaft 4 of the load-free sub-gearbox, in partial diagram b) the clutch torque $M_K$ of the friction clutch K2 and the friction torque $M_{GK}$ of the synchronization of a gear clutch S4 of the load-free sub-gearbox, and in partial diagram c) the regulating pressures $p_K$, $p_{GK}$ of the clutch regulator of the applicable friction clutch K2 used primarily as a regulating parameter and the gear regulator of the gear clutch S4 in question.

Beginning with point in time t1 the synchronization point $p_{Sync}$ of the gear clutch S4 is first started, i.e., the synchronization of gear clutch S4 is stressed with a defined regulating force by means of which the synchronization of gear clutch S4 produces a synchronous torque $M_{Sync}$ and thus accelerates the associated input shaft 4 to the synchronous rotational speed $n_{Sync}$. In the process, the regulating force or the regulating pressure $p_{Sync}$ of the gear regulator is so measured that the gear in questions G4 is not engaged.

Upon the attainment of the synchronous rotational speed $n_{Sync}$ at point in time t2, the adjusting cylinder of the clutch regulator of the respective friction clutch K2 is then pre-filled with a filling pressure $p_{K\_F}$ and a low initializing pressure $p_{K\_I}$ in order to accelerate the procedural sequence. After point in time t3 the successive engagement of the friction clutch K2 occurs with a gradual increase of the regulating pressure $p_K$ of the clutch regulator in question.

As a result, the friction clutch K2 begins to convey a torque $M_{Sync}$ after point in time t4 which at first is smaller than the synchronous torque $M_{Sync}$ set on gear clutch S4 and therefore remains temporarily without any effect. At point in time t5 the clutch torque $M_K$ of the friction clutch K2, however, exceeds the synchronous torque $M_K$ of the gear clutch S4 so that the input shaft 4 with its rotational speed $n_{GE}$ is thereupon accelerated in the direction of the motor rotational speed $n_m$ and thus the synchronization on the gear clutch S4 is ended. This can be recognized by means of the sensor signals of the available rotational speed sensors using the exceeding of a determined rotational speed difference threshold $\Delta n_{GK\_max}$ at the gear clutch S4 or the shortfall of a determined rotational speed difference threshold $\Delta n_{K\_min}$ at the friction clutch K2.

A current value of the touch point $p_{TP}$ is determined from the known synchronous torque $M_{Sync}$ of the gear clutch S4 which can be set equal to the current clutch torque $M_K$ of friction clutch K2 and the current value of the regulating pressure $p_K$ of friction clutch K2 in a known manner, for example by subtraction of an offset value from the actual regulating pressure $p_K$, and thus the torque characteristic curve present $M_K(p_K)$ of the friction clutch K2 is adapted.

Because of the comparatively high regulating force level, the method of the invention to determine the touch point $p_{TP}$ of the friction clutch K2 is relatively accurate and fast. Furthermore for control of the procedural sequence, only the sensor signals are accessed besides sensor data that is present and besides rotational speed and regulating parameter sensors that are present.

Figure 2:
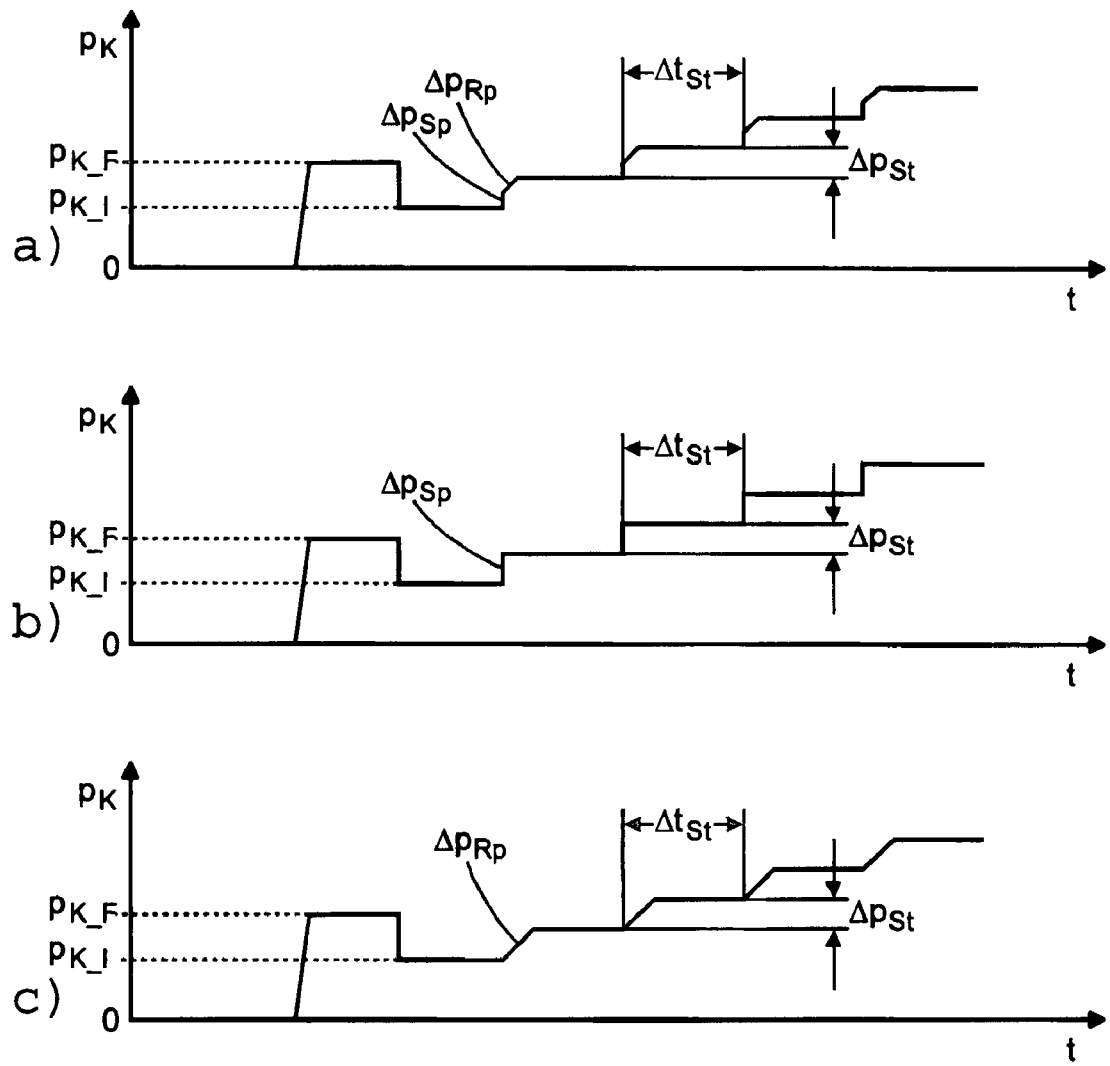
FIG. 2: Is a timing diagram with regulating pressure progressions of various embodiments of the first method variant according to FIG. 1, FIG. 3: Is a timing diagram with rotational speed, rotational torque and regulating pressure progressions according to a second variant of the method of the invention.

Shown in the diagrams of FIG. 2 are possible versions of the gradual engagement of friction clutch K2 of the previously described procedural variant. During the gradual engagement of friction clutch K2 which is depicted here because of the manner of construction of the friction clutch K2 as, for example, a gradual increase of the regulating pressure $p_K$ of the associated clutch regulator, the engagement stages are each designated by an applicable stage offset $\Delta p_{St}$ and an applicable duration of holding $\Delta t_{ST}$.

As shown in detail in partial diagram a) of FIG. 2, the stage offset $\Delta p_{St}$ of the engagement stages of the regulating parameters $p_K$ is preferably formed from an applicable stage jump $\Delta p_{Sp}$ and a following applicable ramp jump $\Delta p_{Rp}$. In the process the application-specific use relates both to the percentage heights of the stage jump $\Delta p_{Sp}$ and the ramp jump $\Delta p_{Rp}$, as well as the gradients of the ramp jump $\Delta p_{Rp}$. With an external application the stage offset $\Delta p_{St}$ of the engagement stages of the regulating parameters $p_K$ can therefore be reduced, as shown in FIG. 1 and in partial diagram b) of FIG. 2, to a stage jump $\Delta p_{Sp}$ or, as shown in partial diagram c) of FIG. 2, to a ramp jump $\Delta p_{Rp}$.

Figure 3:
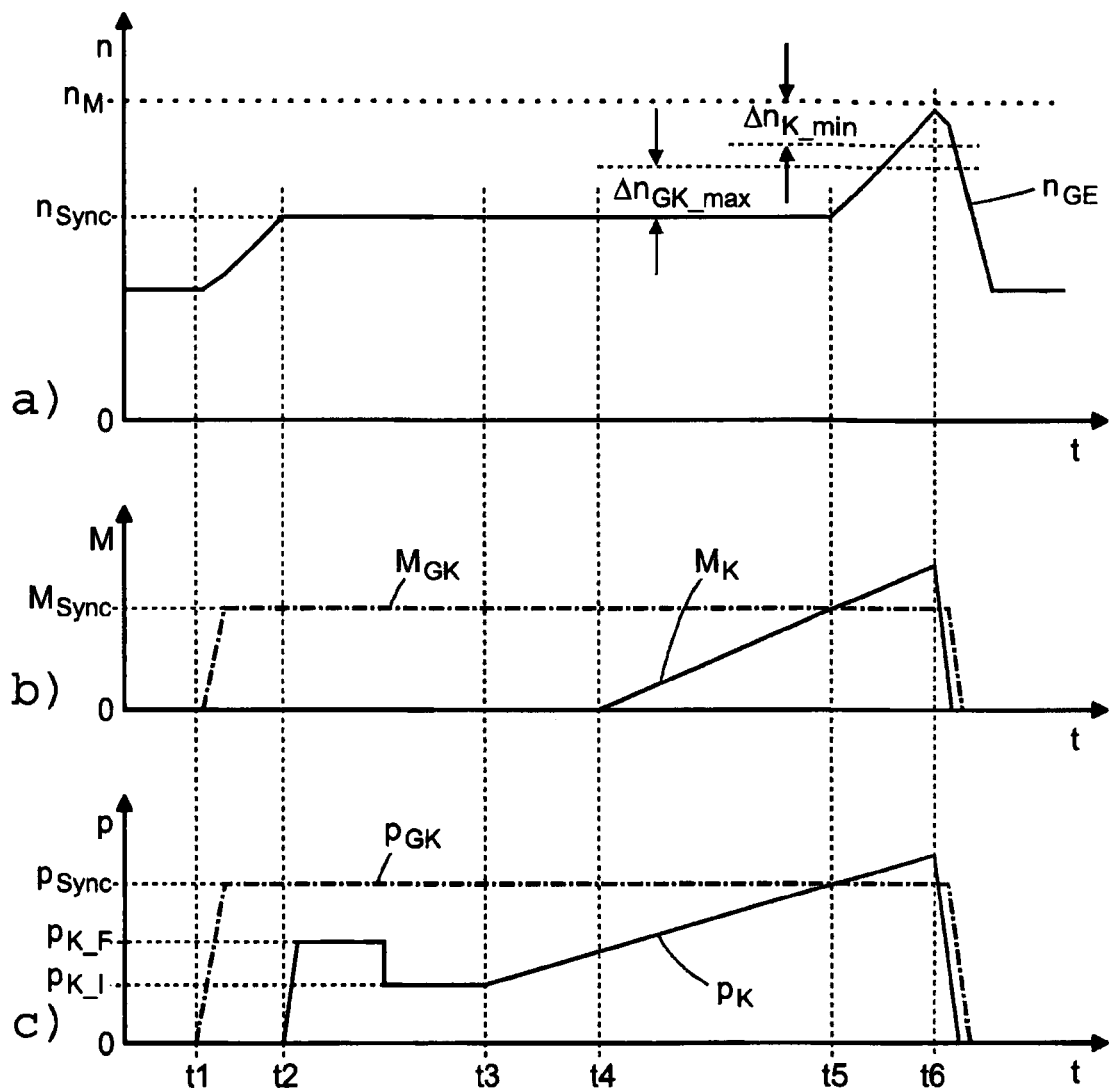

In a second variant of the method of the invention which is shown in FIG. 3 similar to FIG. 1, the engagement of the friction clutch K2 of the load-free sub-gearbox occurs in a ramp-shaped progression of the regulating parameter $p_K$ of the clutch regulator in question with an applicable regulating gradient $dp_K/dt$. Compared to the gradual engagement of the friction clutch K2, the constant engagement is simpler to control but results in a lesser accuracy in the determination of the touch point $p_{TP}$, because of a time delay between the exceeding of the synchronous torque $M_{Sync}$ of the gear clutch by the clutch torque $M_K$ of the friction clutch K2 and the sensing of the cessation of the synchronization at gear clutch S4.

REFERENCE CHARACTERS

1 Dual-clutch transmission
2. Drive shaft of drive motor
3 First input shaft
4 Second input shaft
5 Countershaft
6 Output shaft
7 Output shaft
G1-G6 Forward gears
K1 First friction clutch
K2 Second friction clutch
M Drive motor, torque
$M_{GK}$ Friction torque at the synchronization of the gear clutch
$M_K$ Clutch torque, torque of the friction clutch
$M_{Sync}$ Synchronous torque at the gear clutch
n Rotational speed
$n_{GE}$ Rotational speed of input shaft
$n_M$ Motor rotational sped
$n_{St}$ Number of engagement stages of the friction clutch
$n_{St\_max}$ Maximum number of engagement stages
$n_{St\_min}$ Minimum number of engagement stages
$n_{Sync}$ Synchronous rotation speed at the gear clutch
p Pressure
$p_{GK}$ Regulating pressure, regulating parameter of the gear regulator
$p_K$ Regulating pressure, regulating parameter of the clutch regulator
$p_{K\_F}$ Filling pressure of the clutch regulator
$p_{K\_I}$ Initializing pressure at the clutch regulator
$p_{Sync}$ Synchronous pressure at the synchronous point of the gear clutch
$p_{TP}$ Touch point of the friction clutch
R Reverse gear
S1-S4 Shift packets
t Time
t1-t6 Points in time
x Distance
$x_{GK}$ Regulating path, regulating parameter of the gear regulator
$x_{GK\_max}$ Boundary regulating position
$x_K$ Regulating path, regulating parameter of the clutch regulator
$x_{TP}$ Touch point of the friction clutch
$\Delta n$ Rotational speed difference
$\Delta n_{GE}$ Rotational speed difference of the input shafts
$\Delta n_{GE\_min}$ Rotational speed difference threshold
$\Delta n_{GK}$ Rotational speed difference at the gear clutch
$\Delta n_{GK\_max}$ Rotational speed difference threshold
$\Delta n_K$ Rotational speed difference at the friction clutch
$\Delta n_{K\_min}$ Rotational speed difference threshold
$\Delta p$ Pressure difference
$\Delta p_{Rp}$ Ramp jump of the stage offset
$\Delta p_{Sp}$ Stage jump of the stage offset
$\Delta p_{St}$ Stage offset of the engagement stage
$\Delta t$ Time span
$\Delta t_E$ Engagement time of the friction clutch
$\Delta t_{E\_max}$ Maximum engagement time
$\Delta_{E\_min}$ Minimum engagement time
$\Delta t_{St}$ Duration of holding the engagement stage

The invention claimed is:

1. A method for clutch characteristic curve adaptation of an automatic dual-clutch transmission of a vehicle by use of an electronic control device, the transmission comprises two sub-gearboxes each comprising an input shaft (3, 4) connected, via an associated friction clutch (K1, K2), to a drive shaft (2) of a drive motor (M) and a plurality of gears (G1-G6, R) that are shiftable via a friction-synchronized gear clutch (S1-S4), whereby the electronic control device determines a current value of a touch point of the associated friction clutch (K1, K2) in conjunction with a partial engagement of the associated friction clutch (K1, K2) and acquisition of relevant operating parameters with the drive motor (M) operating and the plurality of gears (G1-G6, R) disengaged in a load-free sub-gearbox, the method comprising the steps of:
    initiating a synchronous point of a gear clutch (S1, S3; S2, S4) of the load-free sub-gearbox with a defined regulating force of an associated gear regulator;

waiting until the gear clutch (S1, S3; S2, S4) of the load-free sub-gearbox is synchronized;

incrementally engaging the associated friction clutch (K1; K2) of the synchronized gear clutch (S1, S3; S2, S4) of the load-free sub-gearbox until the electronic control device determines that the synchronized gear clutch is no longer in synchronization;

once the synchronized gear clutch is no longer in synchronization, ascertaining, via the electronic control device, a current touch point ($x_{TP}$, $p_{TP}$) of the associated friction clutch from a current synchronous torque ($M_{Sync}$) of the gear clutch being synchronized and a current regulating parameter ($x_K$, $p_K$) of the associated clutch regulator, with the current regulating parameter being one of a regulating path, a regulating pressure, a regulating force or an electric regulating current; and adapting a clutch characteristic curve of the associated friction clutch (K1; K2) with the current touch point ($x_{TP}$, $P_{tp}$).

2. The method according to claim 1, further comprising the step of ascertaining the current touch point ($x_{TP}$, $p_{TP}$) and adapting the clutch characteristic curve when the vehicle is stopped in time proximity for the associated friction clutches (K1, K2) of both of the two sub-gearboxes.

3. The method according to claim 1, further comprising the step of the ascertaining the current touch point ($x_{TP}$, $p_{TP}$) and adapting the clutch characteristic curve, while driving, respectively for the associated friction clutch (K1, K2) of the currently load-free sub-gearbox.

4. The method according to claim 1, further comprising the step of checking a degree of engagement of the associated friction clutch (K1, K2) and completely disengaging the associated friction clutch (K1, K2) if the associated friction clutch (K1, K2) is at least partially engaged before ascertaining the current touch point ($x_{TP}$, $p_{TP}$) of the associated friction clutch (K1, K2).

5. The method according to claim 1, further comprising the step of verifying a shift status of the sub-gearbox in question, and if the gear (G1-G6, R) is engaged, the gear (G1-G6, R) is disengaged before ascertaining the current touch point ($x_{TP}$, $p_{TP}$) of the associated friction clutch (K1, K2).

6. The method according to claim 1, further comprising the step of first pre-filling the clutch regulator before engagement of the associated friction clutch (K1, K2) with a filling pressure ($P_{K\_F}$) and a lower initializing pressure ($p_{K\_I}$) when the associated friction clutch (K1, K2) has an actively engagable construction and the associated clutch regulator comprises one of a hydraulic and a pneumatic adjusting cylinder.

7. The method according to claim 6, further comprising the step of lowering at least one of the filling pressure ($p_{K\_F}$) and the initializing pressure ($p_{K\_I}$) of the pre-filling of the clutch regulator with a subsequent ascertaining of the touch point ($x_{TP}$, $p_{TP}$) of the same associated friction clutch (K1, K2) when synchronization at the applicable gear clutch (S1, S3; S2, S4) is cancelled before the attainment of a minimum number ($n_{St\_min}$) of engagement stages, and raising at least one of the filling pressure ($p_{K\_F}$) and the initializing pressure ($p_{K\_I}$) of the pre-filling of the clutch regulator with a following determination of the touch point ($x_{TP}$, $p_{TP}$) of the same associated friction clutch (K1, K2) with a non-determined cessation of the synchronization at the gear clutch (S1, S3; S2, S4) after expiration of the maximum number ($n_{St\_max}$) of engagement stages.

8. The method according to claim 6, further comprising the step of lowering at least one of the filling pressure ($p_{K\_F}$) and the initializing pressure ($p_{K\_I}$) of the pre-filling of the clutch regulator with a following determination of the touch point ($x_{TP}$, $p_{TP}$) of the same associated friction clutch (K1, K2), with cancellation of the synchronization at the applicable gear clutch (S1, S3; S2, S4) before the attainment of a minimum engagement time ($\Delta t_{E\_min}$), and raising at least one of the filling pressure ($p_{K\_F}$) and the initializing pressure ($p_{K\_I}$) of the pre-filling of the clutch regulator with a following determination of the touch point ($X_{TP}$, $P_{TP}$) of the same associated friction clutch (K1, K2) when cancellation of the synchronization at the gear clutch (51, S3; S2, S4) is not established after expiration of the maximum engagement time ($\Delta t_{E\_max}$).

9. The method according to claim 1, further comprising the step of ascertaining the current synchronous point ($P_{Sync}$) of the applicable gear clutch (S1-S4) directly before ascertaining the current touch point ($x_{TP}$, $p_{TP}$) of the associated friction clutch (K1, K2).

10. The method according to claim 1, further comprising the step of starting each synchronous point ($p_{Sync}$) of the gear clutch (S1, S3; S2, S4) of the same gear (G1, G3, G5; G2, G4, G6, R) in the load-free sub-gearbox.

11. The method according to claim 10, further comprising the step of storing a gear-related error report in an error memory after an applicable number of interruptions of the determination of the current touch point ($x_{TP}$, $p_{TP}$) by synchronization of the same gear clutch (S1, S3; S2, S4) and determining a gear clutch (S1, S3; S2, S4) of another gear (G1, G3, G5; G2, G4, G6, R) of the same sub-gearbox for a following determination of the current touch point ($x_{TP}$, $p_{TP}$) of the associated friction clutch (K1, K2).

12. The method according to claim 1, further comprising the step of, when the vehicle is stopped, starting each synchronous point ($p_{Sync}$) of the gear clutch (S1; S2) of a start gear (G1; G2, R) in the load-free sub-gearbox.

13. The method according to claim 1, further comprising the step of, while driving, starting the synchronous point ($p_{Sync}$) of the gear clutch of either a higher or a lower gear (G5, G3; G4, G2) requiring one of one, two or three gear jumps based on the gear (G4; G3) engaged in the other sub-gearbox in the load-free sub-gearbox.

14. The method according to claim 1, further comprising the step of engaging the associated friction clutch (K1; K2) of the load-free sub-gearbox as a gradual progression of the regulating parameter ($p_K$) of the respective clutch regulator with an applicable stage offset ($\Delta p_{St}$) and an applicable duration of holding ($\Delta t_{St}$) per engagement stage.

15. The method according to claim 14, further comprising the step of forming the stage offset ($\Delta p_{St}$) of the engagement stages of the regulating parameter ($p_K$) on a basis of an applicable stage jump ($\Delta p_{Sp}$) and a following applicable ramp jump ($\Delta p_{Rp}$).

16. The method according to claim 14, further comprising the step of ceasing ascertainment of the current touch point ($x_{TP}$, $p_{TP}$) of the associated friction clutch (K1, K2), when cancellation of the synchronization at the applicable gear clutch (S1, S3; S2, S4) is determined before attainment of an applicable minimum number ($n_{St\_min}$) of engagement stages, and is not established up to expiration of an applicable maximum number ($n_{St\_max}$) of engagement stages of the regulating parameter ($p_K$) of the clutch regulator being clutch being synchronized.

17. The method according to claim 1, further comprising the step of the engaging the associated friction clutch (K1; K2) of the load-free sub-gearbox in a ramp-like progression of the regulating parameter ($p_K$) of the respective clutch regulator with an applicable regulating gradient ($dp_K/dt$).

18. The method according to claim 17, further comprising the step of stopping determination of the current touch point ($x_{TP}$, $p_{TP}$) of the associated friction clutch (K1, K2), if cessation of the synchronization at the applicable gear clutch (S1, S3; S2, S4) is determined before attainment of an applicable minimum engagement time ($\Delta t_{E\_min}$) and cessation of the synchronization at the applicable gear clutch (S1, S3; S2, S4) is not determined up to the expiration of an applicable maximum engagement time ($\Delta t_{E\_max}$) of the clutch regulator being synchronized.

19. The method according to claim 1, further comprising the step of canceling the synchronization at the applicable gear clutch (S1, S3; S2, S4) when a rotational speed difference ($\Delta n_{GK}$) at the gear clutch has either reached or exceeded a determined rotational speed difference threshold ($\Delta n_{GK\_max}$).

20. The method according to claim 1, further comprising the step of canceling the synchronization at the respective gear clutch (S1, S3; S2, S4) when the rotational speed difference ($\Delta n_{GE}$, $\Delta n_K$) either between the two input shafts (3, 4) or at the associated friction clutch in question (K1, K2) has either reached or exceeded an established rotational speed difference threshold ($\Delta n_{GE\_min}$, $\Delta n_{K\_min}$).

21. The method according to claim 1, further comprising the step of only starting ascertaining of the current touch point ($x_{TP}$, $p_{TP}$) of the associated friction clutch (K1, K2) when operation of the vehicle is largely static, and discontinuing ascertaining of the current touch point ($x_{TP}$, $p_{TP}$) of the associated friction clutch (K1, K2) when either operation of the vehicle interferes with ascertaining of the current touch point ($x_{TP}$, $p_{TP}$) of the associated friction clutch (K1, K2) or stationary operation of the vehicle stops.

22. The method according to claim 1, further comprising the step of determining a regulating path ($x_{Gk}$) of either the associated gear regulator or an associated transmission element by at least one distance sensor, and ceasing the determination of the current touch point ($x_{TP}$, $p_{TP}$) of the associated friction clutch (K1, K2) either upon reaching or exceeding a predetermined boundary regulating position ($x_{GK\_max}$).

23. The method according to claim 1, further comprising the step of ascertaining a roadway condition during driving by at least one sensor, and ceasing the determination of the current touch point ($x_{TP}$, $p_{TP}$) of the associated friction clutch upon recognition of an unfavorable roadway conditions.

24. The method according to claim 1, further comprising the step of sensing a simulated drive on a roller dynamometer by at least one sensor, and ceasing the determination of the current touch point ($x_{TP}$, $p_{TP}$) of the associated friction clutch (K1, K2) upon recognition of a roller dynamometer drive.

25. The method according to claim 1, further comprising the step of completely disengaging the associated friction clutch (K1, K2) after determination of the current touch point ($x_{TP}$, $p_{TP}$), moving the applicable gear regulator to a neutral position, and, if needed, engaging either a previously disengaged gear (G1, G3, G5; G2, G4, G6, R) or a gear that was requested during the determination of the current touch point.

* * * * *